(12) United States Patent
Lee et al.

(10) Patent No.: US 8,352,403 B2
(45) Date of Patent: Jan. 8, 2013

(54) SYSTEM AND METHOD FOR EFFICIENT REASONING USING VIEW IN DBMS-BASED RDF TRIPLE STORE

(75) Inventors: Seung Woo Lee, Daejeon (KR); Pyung Kim, Daejeon (KR); Jae Han Kim, Seoul (KR); Han Min Jung, Daejeon (KR); Mi Kyung Lee, Daejeon (KR); Dong In Park, Seoul (KR); Won Kyung Sung, Daejeon (KR); Sun Hwa Hahn, Daejeon (KR)

(73) Assignee: Korea Institute of Science and Technology Information, Daejeon (KR)

( * ) Notice: Subject to any disclaimer, the term of this patent is extended or adjusted under 35 U.S.C. 154(b) by 39 days.

(21) Appl. No.: 13/133,573

(22) PCT Filed: Dec. 17, 2008

(86) PCT No.: PCT/KR2008/007473
§ 371 (c)(1),
(2), (4) Date: Jun. 8, 2011

(87) PCT Pub. No.: WO2010/071245
PCT Pub. Date: Jun. 24, 2010

(65) Prior Publication Data
US 2011/0238610 A1    Sep. 29, 2011

(30) Foreign Application Priority Data
Dec. 15, 2008  (KR) .......................... 10-2008-0127511

(51) Int. Cl.
*G06N 5/02* (2006.01)

(52) U.S. Cl. .......................................... 706/47; 707/717
(58) Field of Classification Search .................. 706/47; 707/717
See application file for complete search history.

(56) References Cited

U.S. PATENT DOCUMENTS

| 7,099,885 B2 | 8/2006 | Hellman et al. |
| 2010/0036788 A1* | 2/2010 | Wu et al. .......................... 706/47 |

FOREIGN PATENT DOCUMENTS

KR    10-2001-0109206 A    12/2001
(Continued)

OTHER PUBLICATIONS

Lim et al ("Unifying Data and Domain Knowledge Using Virtual Views" Sep. 2007).*

(Continued)

*Primary Examiner* — Lut Wong
(74) *Attorney, Agent, or Firm* — LRK Patent Law Firm

(57) ABSTRACT

An efficient reasoning system and method using a view in a DBMS-based RDF triple store are provided. The DBMS-based reasoning system includes a triple input unit for receiving a Resource Description Framework (RDF) triple. A triple examination unit examines whether the received triple conforms to RDFS subsumption relation entailment rules or Web Ontology Language (OWL) inverse relation rules. A view creation unit creates a table view when the received triple conforms to the RDFS subsumption relation entailment rules or the OWL inverse relation rules as a result of the examination. A triple storage unit stores the received triple. The DBMS-based triple store can efficiently perform reasoning based on rule rdfs7 or rdfs9, which is included in the RDFS subsumption relation entailment rules, and the OWL inverse relation rules.

4 Claims, 2 Drawing Sheets

FOREIGN PATENT DOCUMENTS

KR     10-2007-0037808 A     4/2007

OTHER PUBLICATIONS

Lim et al ("Semantic Data Management: Towards Querying Data with their Meaning" Apr. 2007).*

International Search Report for International Application No. PCT/KR2008/007473 which corresponds to U.S. Appl. No. 13/133,573.

Dongwon Jeong et al., "A Three-Layered Ontology View Security Model for Access Control of RDF Ontology", Proceedings of Korean Institute of Information Scientists and Engineers, vol. 35, No. 1, Feb. 2008, pp. 29-43, Korean Institute of Information Scientists and Engineers.

Patric Hayes and Brian McBride, "RDF Semantics", Technical report, W3C Recommendation, Feb. 10, 2004, 2004 W3C.

* cited by examiner

[Fig. 1]
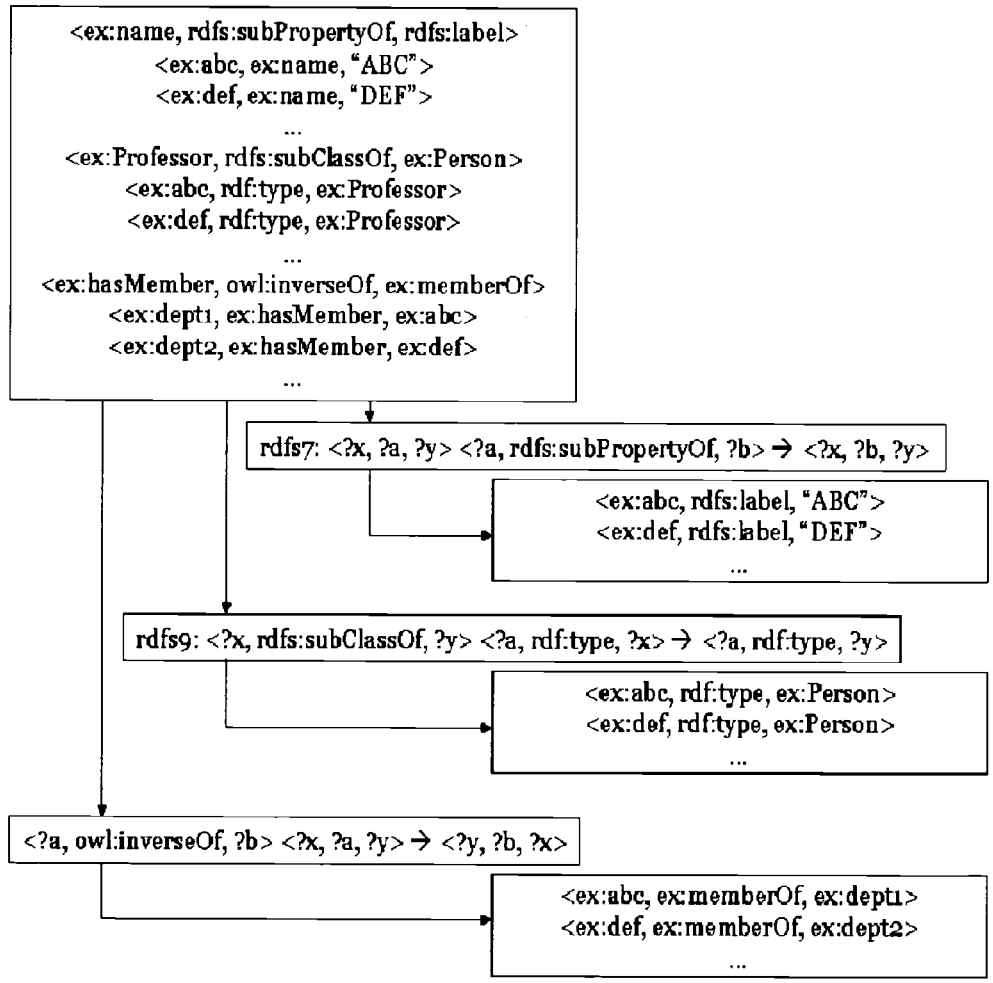
[Fig. 2]
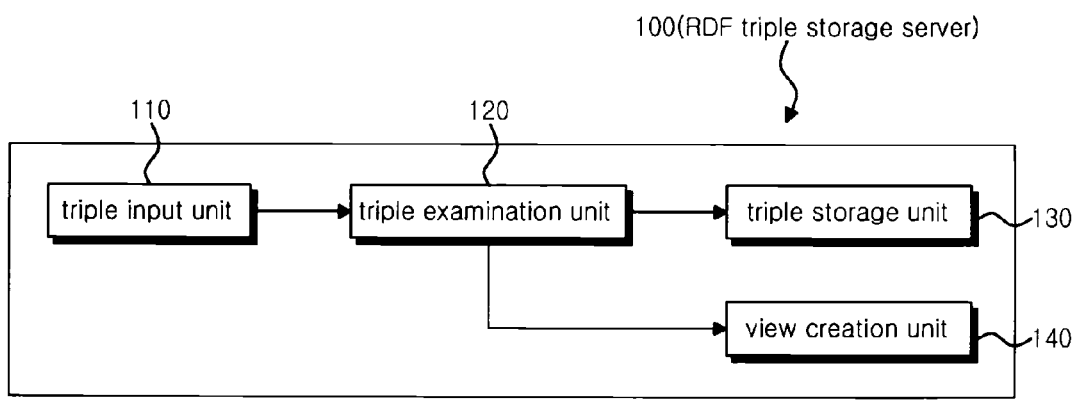

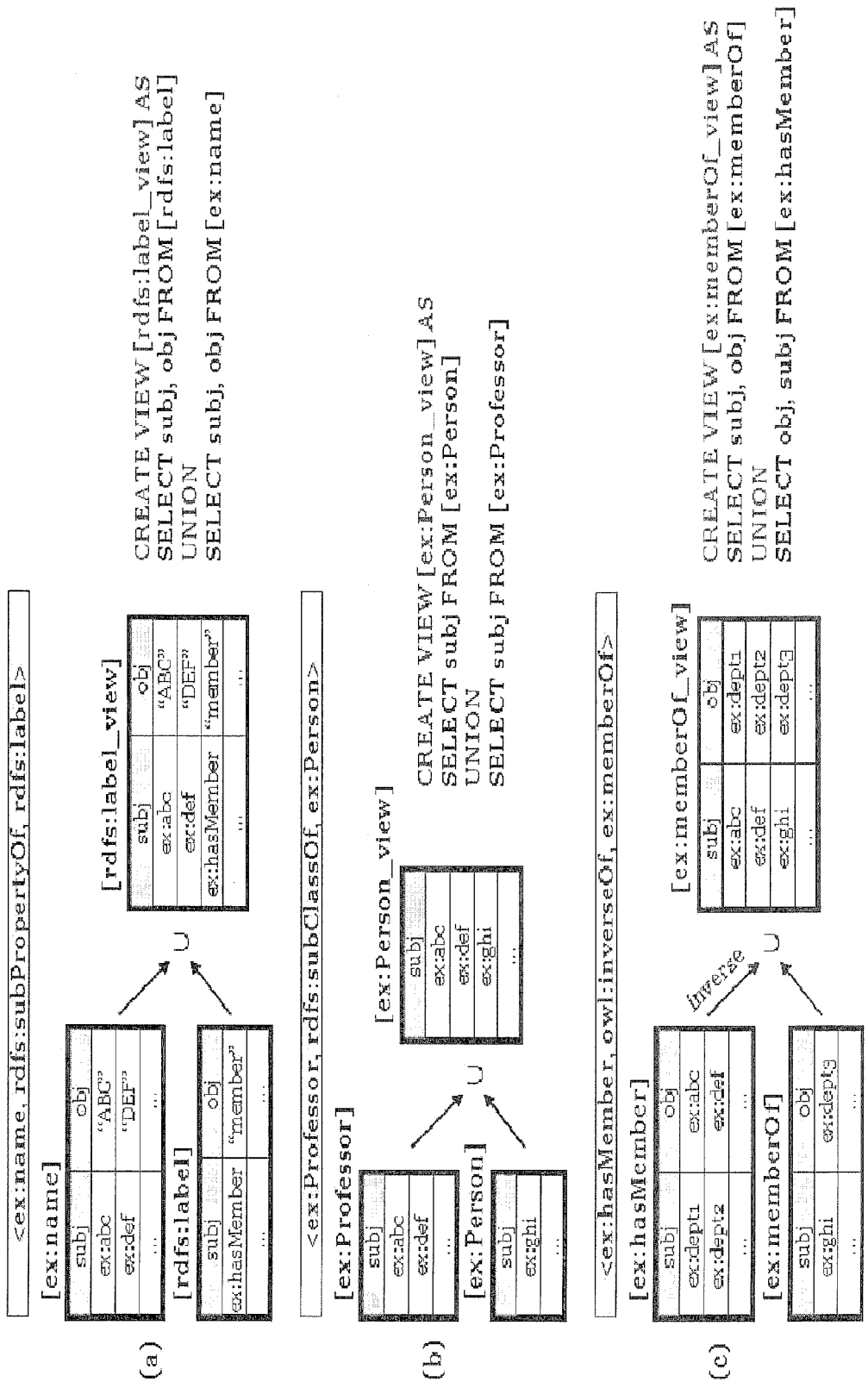
[Fig. 3]

SYSTEM AND METHOD FOR EFFICIENT REASONING USING VIEW IN DBMS-BASED RDF TRIPLE STORE

CROSS REFERENCE TO RELATED APPLICATION

This application is a National Stage of International Application No. PCT/KR2008/007473 filed Dec. 17, 2008, claiming priority based on Korean Patent Application No. 10-2008-0127511 filed Dec. 15, 2008, the content of which is incorporated herein by reference in its entirety.

TECHNICAL FIELD

The present invention relates to a system and method for performing efficient reasoning using a view in a Database Management System (DBMS)-based Resource Description Framework (RDF) triple store. More particularly, the present invention relates to a reasoning system and method, which can replace reasoning based on rule rdfs7 (<?x,?a,?y> <?a, rdfs:subPropertyOf,?b>→<?x,?b,?y>) and rule rdfs9 (<?x, rdfs:subClassOf,?y> <?a,rdf:type,?x>→<?a,rdf:type,?y>), which are RDF schema (RDFS) subsumption relation entailment rules, and based on Web Ontology Language (OWL) inverse relation rules (<?a,owl:inverseOf,?b> <?x,?a, ?y>→<?y,?b,?x>), with a view definition for a Database (DB) table, thus improving the efficiency of the reasoning system.

BACKGROUND ART

Rule-based reasoning is a process for deriving implicit knowledge from explicitly given knowledge through rules. Knowledge in a semantic web is represented by ontology described using Resource Description Framework (RDF), RDF Schema (RDFS), Web Ontology Language (OWL), etc. Since this ontology is a set of RDF triples, rule-based reasoning is a process for deriving a new triple by applying given rules to a set of explicitly given RDF triples.

As various institutions generate ontology and the scale of ontology gradually increases, the size that must be supported by a reasoning system gradually gets closer to the scale of an existing web. In this environment, a method of storing large-capacity RDF triples and reducing unnecessary redundancy of triples generated through reasoning while improving the speed of reasoning is urgently required.

As one method for supporting large capacity, a method of storing RDF triples in a Database Management System (DBMS) has been widely used. The storage of large-capacity triples can be easily achieved using a DBMS, but there are problems in that the efficiency of a store decreases due to unnecessary redundancy occurring in a reasoning process, and reasoning speed decreases due to such inefficiency.

In particular, in the case of rule rdfs7 (<?x,?a,?y> <?a,rdfs: subPropertyOf,?b>→<?x,?b,?y>) and rule rdfs9 (<?x,rdfs: subClassOf,?y> <?a,rdf:type,?x>→<?a,rdf:type,?y>), which are RDFS subsumption relation entailment rules, and OWL inverse relation rules (<?a,owl:inverseOf,?b> <?x,?a, ?y>→<?y,?b,?x>), the number of times that the rules are applied increases, and an excessively large number of triples are generated, so that large storage space is occupied, and the efficiency of reasoning is decreased.

For example, FIG. 1 illustrates part of an ontology for modeling universities. Since the property ex:name is a sub-property of the property rdfs:label, all subjects and objects having the property ex:name are extended to subjects and objects having the property rdfs:label. In the case of classes ex:Professor and ex:Person, extension based on a hierarchical relationship is equally applied, but there is only a difference in that they are classes rather than properties.

Finally, since the property ex:hasMember and the property ex:memberOf are in inverse relation, that is, owl:inverseOf, all subjects and objects of the property ex:hasMember are extended to objects and subjects of the property ex:memberOf, respectively. Such an extension is essentially required for completeness from the standpoint of the query answering of a reasoning system. However, complicated combinations between several triples are not required in such a way that only a predicate in a triple is replaced, or only the sequence of a subject and an object is additionally changed. Accordingly, an operation of simply duplicating and storing triples results in the inefficiency of triple storage and of the reasoning system.

Consequently, in order to improve the efficiency of storage space and reasoning, a device capable of reducing excessively large storage space and the application of reasoning rules is required. Of course, such a device must not obstruct the efficiency of query answering with respect to an RDF triple store.

DISCLOSURE

Technical Problem

Accordingly, an object of the present invention is to provide a reasoning system and method, which are efficient from the standpoint of storage space and reasoning speed by utilizing a view at the time of performing reasoning based on RDFS subsumption relation entailment rules and OWL inverse relation rules in a DBMS-based RDF triple store.

Another object of the present invention is to improve the usefulness of a reasoning system by securing scalability by which more than several billions of RDF triples can be processed on the basis of the efficiency of storage space and reasoning.

Technical Solution

The present invention includes an RDF triple storage server for receiving an RDF triple, examining whether the triple is a triple conforming to RDFS subsumption relation entailment rules or OWL inverse relation rules, creating a view corresponding to the triple if the triple is a triple conforming to the relevant rules, and storing the triple in a DB table corresponding to the type of triple, in a DBMS-based reasoning system capable of storing and reasoning more than several billions of RDF triples using a view.

The present invention provides a Database Management System (DBMS)-based reasoning system, comprising a triple input unit for receiving a Resource Description Framework (RDF) triple, a triple examination unit for examining whether the received triple conforms to Resource Description Framework Schema (RDFS) subsumption relation entailment rules or Web Ontology Language (OWL) inverse relation rules, a view creation unit for creating a table view when the received triple conforms to the RDFS subsumption relation entailment rules or the OWL inverse relation rules as a result of the examination, and a triple storage unit for storing the received triple.

The present invention provides a Database Management System (DBMS)-based reasoning system, comprising a triple input unit for receiving a Resource Description Framework (RDF) triple, a triple examination unit for examining whether the received triple conforms to Resource Description Framework Schema (RDFS) subsumption relation entailment rules or Web Ontology Language (OWL) inverse relation rules, a view creation unit for omitting a reasoning procedure on the received triple and creating a table view when the triple conforms to the RDFS subsumption relation entailment rules or the OWL inverse relation rules as a result of the examination, and a triple storage unit for storing the received triple, wherein the RDFS subsumption relation entailment rules include rule rdfs7 or rdfs9, the rule rdfs7 indicates (<?x, ?a, ?y> <?a, rdfs:subPropertyOf, ?b> <?x, ?b, ?y>), the rule rdfs9 indicates (<?x, rdfs:subClassOf, ?y> <?a, rdf:type, ?x> <?a, rdf:type, ?y>), and the OWL inverse relation rules indicate (<?a, owl:inverseOf, ?b> <?x, ?a, ?y> <?y, ?b, ?x>).

The triple storage unit of the present invention is operated such that, when a property of the received triple is a class instance triple, a subject of the triple is stored as a value of a subject column of a table which has an object of the triple as a table name, and when a property of the received triple is an object property triple or a data type property triple, a subject and an object of the triple are respectively stored as values of a subject column and an object column of a table which has a predicate of the triple as a table name.

The present invention provides a Database Management System (DBMS)-based reasoning method, comprising the steps of receiving a Resource Description Framework (RDF) triple, examining whether the received triple conforms to Resource Description Framework Schema (RDFS) subsumption relation entailment rules or Web Ontology Language (OWL) inverse relation rules, and creating a table view when the received triple conforms to the RDFS subsumption relation entailment rules or the OWL inverse relation rules as a result of the examination.

Further, the present invention provides a Database Management System (DBMS)-based reasoning method, comprising the steps of receiving a Resource Description Framework (RDF) triple, examining whether the received triple conforms to Resource Description Framework Schema (RDFS) subsumption relation entailment rules or Web Ontology Language (OWL) inverse relation rules, and creating a table view when the received triple conforms to the RDFS subsumption relation entailment rules or the OWL inverse relation rules as a result of the examination, wherein the RDFS subsumption relation entailment rules include rule rdfs7 or rdfs9, the rule rdfs7 indicates (<?x, ?a, ?y> <?a, rdfs:subPropertyOf, ?b> <?x, ?b, ?y>), the rule rdfs9 indicates (<?x, rdfs:subClassOf, ?y> <?a, rdf:type, ?x> <?a, rdf:type, ?y>), and the OWL inverse relation rules indicate (<?a, owl:inverseOf, ?b> <?x, ?a, ?y> <?y, ?b, ?x>).

Advantageous Effects

The efficient reasoning system and method using a view in a DBMS-based RDF triple store according to the present invention are advantageous in that reasoning based on RDFS subsumption relation entailment rules and OWL inverse relation rules is replaced with a view definition for a DB table without physically extending triples, thus improving the efficiency of a reasoning system and increasing the size of reasoning space in the reasoning system.

DESCRIPTION OF DRAWINGS

FIG. 1 is a diagram showing examples of part of an ontology for modeling universities, RDFS subsumption relation entailment rules and OWL inverse relation rules, and triples extended through reasoning by applying the rules to the ontology;

FIG. 2 is a diagram showing the construction of a reasoning system for storing and reasoning RDF triples according to the present invention; and FIG. 3 is a diagram showing an example of a DBMS view definition capable of replacing reasoning based on RDFS subsumption relation entailment rules and OWL inverse relation rules according to the present invention.

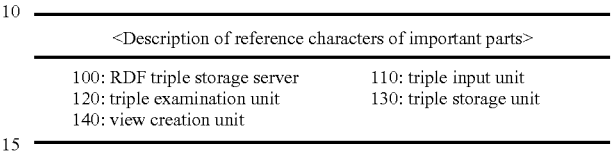

| <Description of reference characters of important parts> | |
|---|---|
| 100: RDF triple storage server | 110: triple input unit |
| 120: triple examination unit | 130: triple storage unit |
| 140: view creation unit | |

BEST MODE

The terms and words used in the present specification and claims should not be interpreted as being limited to their typical meaning based on the dictionary definitions thereof, but should be interpreted to have the meaning and concept relevant to the technical spirit of the present invention, on the basis of the principle by which the inventor can suitably define the implications of terms in the way which best describes the invention.

Further, RDF, RDFS and OWL used in the present invention are described to have the following meanings.

In a semantic web, the meanings of contents are represented using a Resource Description Framework (hereinafter referred to as an "RDF"). RDF is a framework for the description and exchange of metadata, and may be regarded as a core factor of a semantic web. RDF supports common rules for semantics, structures and syntax for the purpose of semantic connection between various types of metadata. By way of this mechanism, RDF supports interoperation between metadata for exchanging information resources comprehensible by machines. RDF defines data elements required for various types of metadata without defining semantics of the metadata, thus enabling the data elements to be used.

The specification of an RDF data model asserts the properties of information resources, and provides no mechanism for defining relationships between properties and other resources. This problem can be solved by RDFS (hereinafter referred to as an "RDF schema") defined in an RDF schema specification. An RDF schema describes a set of resources usable to describe the properties of resources, and defines the structure of metadata used to describe web resources using specific vocabularies used in a given application.

The specification of an RDF schema is composed of several basic classes and properties and may be extended from another domain to allow the classes and the properties to be applied to a given domain. Classes may be aligned using a hierarchical method and the use of properties may be restricted by the members of classes.

RDF and RDF schema are standards enabling metadata of web resources to be described, but are restricted in properties and are limited in representing inheritance relationship between classes. Web Ontology Language (OWL) includes a lot of properties required to support more sufficient expressiveness than RDF and RDF schema in order to describe an ontology on the web.

In addition, RDF is a standard for describing metadata about resources on the web and was established by the World Wide Web Consortium (W3C). RDF data may be regarded as a set of sentences each having a triple structure composed of a subject, a predicate, and an object. An RDF schema provides a method capable of describing additional semantic information in an RDF data model. The term "additional semantic information" means in detail a hierarchical relationship between the type classes and properties of resources. RDF schema reasoning may be regarded as a process for adding new sentences, which are not described, to RDF data using RDF schema information.

A reasoning process uses rule-based reasoning used in existing knowledge-based systems. W3C proposed 13 kinds of RDF schema entailment rules to be used for reasoning, and the results of reasoning of all RDF schema can be obtained through such rules.

Currently, a plurality of RDF store systems is supporting RDF schema reasoning using RDF schema entailment rules. The strategy of RDF schema reasoning is mainly divided into forward reasoning and backward reasoning. The forward reasoning is a method of reaching a final goal by successively applying rules that are applicable to currently defined facts. The backward reasoning is a method of starting with a desired goal and finding facts capable of supporting the goal.

Sesame, which is a representative RDF store system, provides a DBMS-based RDF schema reasoning engine together with a DBMS-based persistent data model. The strategy of the RDF schema reasoning of Sesame uses an instant evaluation method, and employs forward reasoning. That is, during a data storage process, an RDF schema reasoning procedure is performed, and then all reasoning results are stored. This forward reasoning strategy is advantageous in that, since all reasoning results are stored, processing speed is high. In contrast, since reasoning is performed at the time of storing data, the performance of RDF schema reasoning greatly influences the performance of data storage. In the case of data of the National Cancer Institute (NCI) ontology, about 30% of data storage time is required for a reasoning process. Further, even during data updating, a reasoning process is required, which also takes a certain amount of time. Therefore, in order to efficiently manage RDF schema data, the improvement of reasoning performance is needed.

The reasoning process of Sesame is configured to repeatedly apply 13 RDF schema entailment rules and to terminate reasoning when reasoned sentences are not present any more. Since the rules are repeatedly applied in this way until results cannot be obtained any more, this reasoning process is called exhausted forward reasoning.

Hereinafter, RDF entailment rules are described in detail. RDF schema entailment rules proposed in RDF Semantics basically have a structure of deriving sentences from the existence of other sentences. The following Table 1 shows RDF entailment rule 1 and RDF schema entailment rules 2 to 13 among RDF schema entailment rules.

TABLE 1

| Rule | Condition | Conclusion |
|---|---|---|
| rdf1 | ?u ?a ?y | ?a rdf:type rdf:Property |
| rdfs2 | ?a rdfs:domain ?x ?u ?a ?y | ?u rdf:type ?x |
| rdfs3 | ?a rdfs:range ?x ?u ?a ?y | ?y rdf:type ?x |
| rdfs4a | ?u ?a ?y | ?u rdf:type rdfs:Resource |
| rdfs4b | ?u ?a ?y | ?y rdf:type rdfs:Resource |
| rdfs5 | ?u rdfs:subPropertyOf ?v ?v rdfs:subPropertyOf ?x | ?u rdfs:subPropertyOf ?x |
| rdfs6 | ?u rdf:type rdf:Property | ?u rdfs:subPropertyOf ?u |
| rdfs7 | ?a rdfs:subPropertyOf ?b ?u ?a ?y | ?u ?b ?y |
| rdfs8 | ?u rdf:type rfds:Class | ?u rdfs:subClassOf rdfs:Resource |
| rdfs9 | ?u rdfs:subClassOf ?x ?v rdf:type ?u | ?v rdf:type ?x |

TABLE 1-continued

| Rule | Condition | Conclusion |
|---|---|---|
| rdfs10 | ?u rdf:type rdfs:Class | ?u rdfs:subClassOf ?u |
| rdfs11 | ?u rdfs:subClassOf ?v ?v rdfs:subClassOf ?x | ?u rdfs:subPropertyOf ?x |
| rdfs12 | ?u rdf:type rdfs:ContainmembershopProperty | ?u rdfs:subPropertyOf rdfs:member |
| rdfs13 | ?u rdf:type rdfs Datatype | ?u rdfs:subClassOf rdfs:Literal | rdfs:subClassOf: Class hierarchies can be created by describing a sentence stating that an arbitrary class is a subclass of another class. For example, it may be stated that a class 'Person' is a subclass of the class 'Mammal'. On the basis of this statement, the reasoning system can deduce that, when a certain individual belongs to the class 'Person', the individual also belongs to the class 'Mammal'.
rdf:Property: Properties are used to state the relationships between individuals and between individuals and data values. 'hasChild', 'hasRelative', 'hasSibling' and 'has Age' are several examples of properties. The first three properties can be used to represent the relationship between instances of the class 'Person' (such a property is called 'ObjectProperty'). The last property 'hasAge' can be used to represent the relationship between the instance of the class 'Person' and integer data values (such a property is called 'DatatypeProperty').
rdfs:subPropertyOf: Property hierarchies can be created by describing a sentence stating that an arbitrary property is a subproperty of one or more properties. For example, the property 'hasSibling' can be stated to be a subproperty of the property 'hasRelative'. On the basis of this statement, the reasoning system can deduce that, when two arbitrary individuals are related to each other by the property 'hasSibling', they are also related to each other by the property 'hasRelative'.
rdfs:domain: A domain of a property limits the collection of individuals to which the property can be applied. If one individual is related to another individual through a certain property, the relevant individual must belong to a class stated to be the domain of the property. For example, if the class 'Mammal' is stated to be a domain of the property 'hasChild', and the relational statement 'Frank hasChild Anna' is given, the reasoning system can deduce that 'Frank' belongs to the class 'Mammal'.
rdfs:range: This limits a set of individuals which the property can have as its value. When one individual is related to another individual through a certain property, the latter individual must belong to a class stated to be the range of the property. For example, if the class 'Mammal' is stated to be the range of the property 'hasChild', and a relational statement 'Louise hasChild Deborah' is given, the reasoning system can deduce that 'Deborah' belongs to the class 'Mammal'.

The core of a DBMS-based RDF data model is a triple table. The triple table is configured to store all the sentences of RDF data. Although there is a difference according to a method of implementing respective stores, a triple table has the following schema, as shown in Table 2 or 3.

TABLE 2

| ID | Subject | Predicate | Object | Explicit |
|---|---|---|---|---|
| 1 | write | rdfs:range | article | 1 |
| 2 | article | rdfs:subClassOf | publication | 1 |
| 3 | Jim | write | writing01 | 1 |

TABLE 3

| ID | Subject | Predicate | Object | Explicit |
|---|---|---|---|---|
| 1 | write | rdfs:range | article | 1 |
| 2 | article | rdfs:subClassOf | publication | 1 |
| 3 | Jim | write | writing01 | 1 |
| 4 | writing01 | rdf:type | article | 0 |
| 5 | writing01 | rdf:type | publication | 0 |

Table 2 shows an example of a triple table before reasoning is performed, and Table 3 shows an example of a triple table after reasoning has been performed. Respective columns of the triple table have the following meaning. An ID column is a column for storing the unique ID of a sentence, and Subject, Predicate, and Object columns are columns for dividing a sentence into a subject, a predicate and an object and respectively storing the subject, the predicate and the object. An Explicit column indicates whether this sentence is explicitly defined in RDF data, wherein a sentence generated through reasoning has a value of 0 and a sentence explicitly defined in data has a value of 1. Further, the triple table must not have duplicated sentences. Referring to Table 3, it can be seen that, after reasoning, sentences in which the Explicit column is 0 are generated. These sentences are generated as a result of the application of RDF schema entailment rules.

RDF schema entailment rules can be classified as follows depending on the semantics of rules.

1. category 1: Rules for designation of basic type of resources: rdf1, rdfs4a, rdfs4b
2. category 2: Reasoning rules for resource type using property, domain and range information: rdfs2, rdfs3
3. category 3: Reasoning rules for class hierarchies: rdfs8, rdfs10, rdfs11, rdsf13
4. category 4: Reasoning rules for property hierarchies: rdfs5, rdfs6, rdfs12
5. category 5: Reasoning rule using class hierarchies: rdfs9
6. category 6: Reasoning rule for property hierarchies: rdfs7

The rule rdfs9 included in category 5 and the rule rdfs7 included in category 6 are called RDF schema subsumption relation entailment rules. The present invention using the RDF schema subsumption relation entailment rules will be described below.

Hereinafter, OWL is described first. OWL is classified into OWL Lite, OWL DL and OWL Full.

OWL Lite is a language for users who need the representation of classification hierarchies and simple constraints. For example, OWL Lite supports the representation of the constraints of cardinalities, but it permits only the cardinality values of 0 or 1. It is simpler to manufacture a tool for supporting OWL Lite than to manufacture a tool for supporting other lower languages. OWL Lite is suitable for the purpose of rapidly and easily configuring expressive languages of thesauri or other taxonomies as OWL. OWL Lite has a lower theoretical complexity than that of OWL DL.

OWL DL is suitable for users who want the maximum expressiveness while retaining computational completeness and decidability. The term 'completeness' means characteristics that all conclusions are guaranteed to be computable, and the term 'decidability' means characteristics that all computations will finish in finite time. OWL DL includes all vocabularies of OWL. OWL DL is so named due to its correspondence with description logics.

OWL Full is suitable for users who want both the maximum expressiveness and the syntactic freedom of RDF without any computational guarantees. For example, in OWL Full, a class can be treated simultaneously as a collection of individuals and as an individual itself. OWL Full allows ontology to augment the meaning of pre-defined (RDF or OWL) vocabularies.

Hereinafter, the reason for applying OWL inverse relation rules will be described.

inverseOf: This states that two properties are in inverse relation to each other. If property P1 is stated to be the inverse of property P2, and X is related to Y by the property P2, Y is related to X by the property P1. For example, if the property 'hasChild' is stated to be the inverse of the property 'hasParent' and 'Deborah hasParent Louise' is stated, the reasoning system can deduce 'Louise hasChild Deborah'.

In inverse relation rules, the reason for explicitly specifying inverse properties between two properties is that bi-directional storage has redundancy, and correct reasoning can be performed only when redundancy is thoroughly excluded in an ontology including RDF.

Hereinafter, embodiments of the present invention will be described in detail with reference to the attached drawings.

A wired/wireless communication connection method and a computer communication and operation processing method are well-known technologies, and can be easily implemented by those skilled in the art. The system of the present invention is characterized in that it includes a server for receiving and storing an RDF triple while being connected to a wired/wireless communication network and for providing a function of performing reasoning based on RDF schema subsumption relation entailment rules and OWL inverse relation rules.

First, a Database Management System (DBMS) is a program allowing a plurality of computer users to record data in a DB or access data stored in the DB.

A minimum unit of information is defined as the expression of a triple format (subject-predicate-object), and all information is divided into minimum units to configure models, and thereafter semantics are implemented through the relationship between the models.

The server according to the present invention is a computer for communicating with a network and performing operation processing on the computer. Further, the server according to the present invention includes components for performing various functions, the respective components being operated by the processor, memory and input/output means of the server. Methods in which the components of the server of the present invention are operated by the processor, the memory or the input/output means of the server are well-known technologies, and can be easily implemented by those skilled in the art.

The system of the present invention includes an RDF triple storage server 100 for receiving an RDF triple, examining whether the triple conforms to RDFS subsumption relation entailment rules or OWL inverse relation rules, defining a view corresponding to the triple when the triple conforms to the relevant rules, and storing the triple in the DBMS.

FIG. 2 is a diagram showing the construction of the RDF triple storage server 100 according to an embodiment of the present invention. Hereinafter, the construction of the RDF triple storage server 100 according to an embodiment of the present invention will be described in detail with reference to FIG. 2.

The RDF triple storage server 100 of the present invention includes a triple input unit 110 for receiving an RDF triple, a triple examination unit 120 for examining whether the received triple conforms to the RDFS subsumption relation entailment rules or the OWL inverse relation rules, a view creation unit 140 for defining a view conforming to relevant reasoning rules, and a triple storage unit 130 for storing the triple in the DBMS in the form of a table.

The triple input unit 110 receives the RDF triple through an ontology input device, such as an ontology management system or an ontology collector. In this case, the format of the RDF triple includes all ontology formats, such as RDF/Extensible Markup Language (XML), N-Triples, and Turtle. Further, in order to recognize each RDF triple in the format of the received RDF triple, an analysis procedure conforming to the relevant RDF triple format is performed.

The triple examination unit 120 examines whether the received RDF triple conforms to the RDFS subsumption relation entailment rules or the OWL inverse relation rules. In other words, whether the predicate of the triple corresponds to one of rdfs:subPropertyOf, rdfs:subClassOf, and owl:inverseOf is examined.

rdfs:subPropertyOf states that an arbitrary property is a subproperty of one or more properties, rdfs:subClassOf states that an arbitrary class is a subclass of another class, and owl:inverseOf states that one property is the inverse of the other property, as described above.

As a result of the examination, when the triple conforms to the RDFS subsumption relation entailment rules or the OWL inverse relation rules, the triple is transferred not only to the triple storage unit 130, but also to the view creation unit 140.

The triple storage unit 130 generates different DB tables depending on the types of triples, and stores each triple in a corresponding DB table. The types of triples may be classified into a class instance triple, the predicate of which is rdf:type, an object property triple, the predicate of which is an object property, and a data type property triple, the predicate of which is a data type (Datatype) property. In the case of the class instance triple, an instance which is the subject of the triple is stored as the value of the subject column of a table which has the object of the triple, that is, a class name, as a table name. In the remaining two types of triples, the subject and object of each triple are stored as the values of the subject and object columns of a table which has a predicate as a table name.

The view creation unit 140 creates a view corresponding to the triple, which is determined by the triple examination unit 120 to conform to the RDFS subsumption relation entailment rules or the OWL inverse relation rules, instead of performing reasoning on the triple on the basis of the relevant rules.

FIG. 3 is described below by way of example. In the state in which a triple is received and stored, as indicated to the left of arrows, when a triple <ex:name, rdfs:subPropertyOf, rdfs:label> is input, the subject and object of the triple, the predicate of which is ex:name, must be capable of simultaneously becoming the subject and object of rdfs:label, respectively. However, as shown in an uppermost portion (a) of FIG. 3, a union of a table [ex:name] and another table [rdfs:label] is defined as [rdfs:label_view], and this view is used in query answering, so that the view can replace reasoning based on subsumption relation entailment rules using rdfs:subPropertyOf.

In the case of reasoning based on subsumption relation entailment rules using rdfs:subClassOf, a union of a table [ex:Person] and another table [ex:Professor] is defined as [ex:Person_view], as shown in a center portion (b) of FIG. 3, and this view is used in query answering, thus satisfying the above requirement.

Finally, even in the case of reasoning based on inverse relation rules using owl:inverseOf, the above requirement is satisfied using the same method except that a procedure for exchanging a subject and an object with each other is additionally performed. That is, when a union of a table [ex:memberOf] and another table [ex:hasMember] is generated, the union is obtained by exchanging the subject column and the object column of the tale [ex:hasMember] with each other. Since such a DBMS-based view merely has a definition, without performing physical storage, it is possible to not only shorten the time required to store triples due to the extension of reasoning, but also improve the efficiency of storage space.

The method of the present invention can be implemented in the form of computer-readable code in a computer-readable storage medium. The computer-readable storage medium is a recording device in which data readable by a computer system is stored. The storage medium may be, for example, Read-Only Memory (ROM), Random Access Memory (RAM), cache memory, a hard disc, an optical disc, a floppy disc, magnetic tape, etc. Further, the storage medium may be provided in carrier wave form, and may include, for example, provision computer-readable code in a computer-readable storage medium. The computer-readable storage medium is a recording device in which data readable by a computer system is stored. The storage medium may be, for example, Read-Only Memory (ROM), Random Access Memory (RAM), cache memory, a hard disc, an optical disc, a floppy disc, magnetic tape, etc. Further, the storage medium may be provided in carrier wave form, and may include, for example, provision over the Internet. Further, the computer-readable storage medium may be distributed to computer systems connected through a network and the computer-readable code may be stored and executed in the computer systems in a distributed manner.

Although the preferred embodiments of the present invention have been described in detail, those skilled in the art will appreciate that various modifications and changes are possible within the scope and spirit of the present invention. It is apparent that these modifications and changes belong to the accompanying claims.

INDUSTRIAL APPLICABILITY

The present invention relates to an efficient reasoning system and method using a view in a DBMS-based RDF triple store, which are advantageous in that reasoning based on rules rdfs7 and rdfs9, which are RDFS subsumption relation entailment rules, and based on OWL inverse relation rules is replaced with a view definition for a DB table, thus improving the efficiency of a reasoning system and increasing the size of reasoning space in the reasoning system.

The invention claimed is:

1. A computer implemented Database Management System (DBMS)-based reasoning system comprising:
   a triple input unit for receiving a Resource Description Framework (RDF) triple;
   a triple examination unit for examining whether the received triple conforms to Resource Description Framework Schema (RDFS) subsumption relation entailment rules or Web Ontology Language (OWL) inverse relation rules;
   a view creation unit for creating a table view when the received triple conforms to the RDFS subsumption relation entailment rules or the OWL inverse relation rules as a result of the examination; and
   a triple storage unit for storing the received triple,
   wherein the table view indicates a virtual table for a DBMS table.

2. The DBMS-based reasoning system according to claim 1, wherein the view creation unit:
   creates a table view for an object of the triple, which is defined as a union of a table corresponding to a subject of the triple and a table corresponding to the object of the triple when a predicate of the triple is rdfs:subPropertyOf or rdfs:subClassOf indicative of a subsumption relation as a result of the examination, and creates a table view for the object of the triple, which is defined as a union of an inverse of the table corresponding to the subject of the triple and the table corresponding to the object of the triple when the predicate of the triple is owl:inverseOf as a result of the examination,
   wherein the inverse of the table means exchanging subject and object columns of the table.

3. A Database Management System (DBMS)-based reasoning method comprising:
   receiving a Resource Description Framework (RDF) triple;
   examining whether the received triple conforms to Resource Description Framework Schema (RDFS) subsumption relation entailment rules or Web Ontology Language (OWL) inverse relation rules;
   omitting a reasoning process for the received triple and creating a table view when the received triple conforms to the RDFS subsumption relation entailment rules or the OWL inverse relation rules as a result of the examination; and
   storing the received triple in a DBMS table, wherein the table view indicates a virtual table for the DBMS table.

4. The DBMS-based reasoning method according to claim 3, wherein the creating of a table view comprises:

creating a table view for an object of the triple, which is defined as a union of a table corresponding to a subject of the triple and a table corresponding to the object of the triple when a predicate of the triple is rdfs:subPropertyOf or rdfs:subClassOf indicative of a subsumption relation as a result of the examination, and creating a table view for the object of the triple, which is defined as a union of an inverse of the table corresponding to the subject of the triple and the table corresponding to the object of the triple when the predicate of the triple is owl:inverseOf as a result of the examination, wherein the inverse of the table means exchanging subject and object columns of the table.

* * * * *